United States Patent [19]

Richter

[11] 4,371,801
[45] Feb. 1, 1983

[54] METHOD AND APPARATUS FOR OUTPUT REGULATION OF MULTIPLE DISK PERMANENT MAGNET MACHINES

[75] Inventor: Eike Richter, Scotia, N.Y.

[73] Assignee: General Electric Company, Schenectady, N.Y.

[21] Appl. No.: 223,962

[22] Filed: Jan. 12, 1981

Related U.S. Application Data

[63] Continuation-in-part of Ser. No. 950,317, Oct. 11, 1978, abandoned.

[51] Int. Cl.³ .................................... H02K 19/26
[52] U.S. Cl. ......................... 310/156; 310/191; 310/254; 310/268; 310/162
[58] Field of Search ................... 310/114–117, 310/156, 49 R, 268, 254, 162, 163, 191, 209

[56] References Cited

U.S. PATENT DOCUMENTS

| | | |
|---|---|---|
| 1,144,012 | 6/1915 | Walton . |
| 1,829,686 | 10/1931 | Swendsen . |
| 2,151,146 | 3/1939 | Bostwick ........................ 172/278 |
| 2,573,494 | 10/1951 | Rosenberg ...................... 171/252 |
| 2,600,052 | 6/1952 | Ellis ............................... 318/243 |
| 3,077,548 | 2/1963 | Moressee et al. ............... 310/154 |
| 3,089,069 | 5/1963 | Thomas .......................... 318/138 |
| 3,229,137 | 1/1966 | McCarty ........................ 310/268 |
| 3,233,133 | 2/1966 | Kober ............................ 310/191 |
| 3,315,106 | 4/1967 | Reynst ........................... 310/191 X |
| 3,405,296 | 10/1968 | Stilley et al. ................... 310/116 |
| 3,407,320 | 10/1968 | McLean ......................... 310/87 |
| 3,713,015 | 1/1973 | Frister ........................... 310/191 X |
| 3,800,175 | 3/1974 | Plotscher ....................... 310/191 X |

Primary Examiner—Mark O. Budd
Attorney, Agent, or Firm—William H. Steinberg; James C. Davis, Jr.; Marvin Snyder

[57] ABSTRACT

Output regulation of a permanent magnet excited disk-type synchronous machine having permanent magnets attached to rotor disks in multipolar configuration is achieved by controlled alignment of stator windings. Rotor disks support permanent magnets oriented to direct flux axially through the machine, and multiple stator disks having distributed multi-phase windings have means to rotate one of the stator disks to cause misalignment of windings on adjacent disks having the same phase. By controlling the degree of phase misalignment, output voltage of a generator or power factor of a motor may be controlled.

15 Claims, 6 Drawing Figures

METHOD AND APPARATUS FOR OUTPUT REGULATION OF MULTIPLE DISK PERMANENT MAGNET MACHINES

BACKGROUND OF THE INVENTION

This application is a continuation-in-part of application Ser. No. 950,317, filed Oct. 11, 1978, now abandoned.

This invention relates to permanent magnet disk-type synchronous machines, and, in particular, to a method and apparatus for controlling the output of such machines.

Permanent magnet excited machines show a number of advantages in applications where a high machine utilization (output per unit mass) is required. By using permanent magnets, electrical connections to pole pieces and the hardware normally used therefor are not required in the rotor assembly. The complexity of the rotor and its support structure is thereby reduced, which greatly simplifies assembly of the machine. Since no electrical connections to pole pieces are required, higher output per unit mass of the synchronous machine, e.g., greater than 3 KVA/lb., is achieved.

The primary draw-back of permanent magnet disk-type synchronous machines has been the difficulty of controlling output voltage in generators and power factor in motors. This is due to the lack of a system to control the flux level within the machine. This becomes especially severe in variable-speed generating systems where exceptionally high voltage levels can be produced at high operating speed. For example, in aircraft generating systems and flywheel energy storage systems, very high speeds can be applied, and since speed variation is directly linked to the energy transfer process, i.e., output voltage, very high voltages are generated in the disks. Such extreme voltage levels require additional equipment solely to handle the extreme voltages, and further reduces machine utilization in overall output per unit mass.

By controlling the effective flux level within the machine, the output voltage can be regulated regardless of generator rotational speed. Similarly, output speed in motors combined with an inverter, e.g., static power converters, or power factors in strictly synchronous motors can be controlled.

Therefore, the object of this invention is to provide a method and apparatus to control the effective flux level within a permanent magnet synchronous machine.

SUMMARY OF THE INVENTION

In accordance with this invention, a synchronous machine having a rotor including disks mounted on a shaft rotatable about its longitudinal axis incorporates permanent magnets mounted on the rotor disks. Means are provided to rotate at least one of the stator disks to control alignment of the poles of the multiphase stator windings having the same phase, thereby controlling the effective flux level within the machine.

BRIEF DESCRIPTION OF THE DRAWINGS

The features of the invention believed to be novel and unobvious over the prior art are set forth with particularity in the appended claims. The invention itself, however, as to organization, method of operation and objects and advantages thereof, may best be understood by reference to the following description taken in conjunction with the accompanying drawings wherein:

MANNER AND PROCESS OF MAKING AND USING THE INVENTION

The particular apparatus shown in FIGS. 1-4 and the technique described in conjunction therewith are merely exemplary, and the scope of the invention is defined in the claims.

Figure 1:
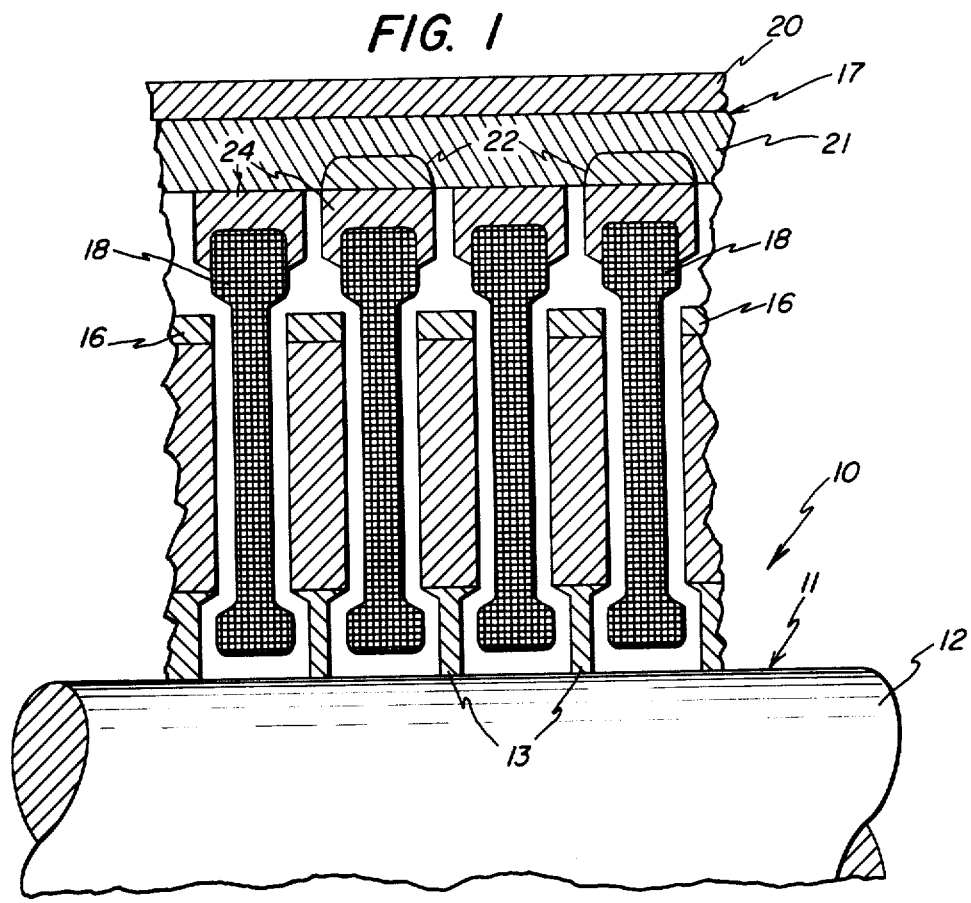
FIG. 1 is a partial schematic cross-sectional view showing one-half of the machine of the instant invention.
Figure 2:
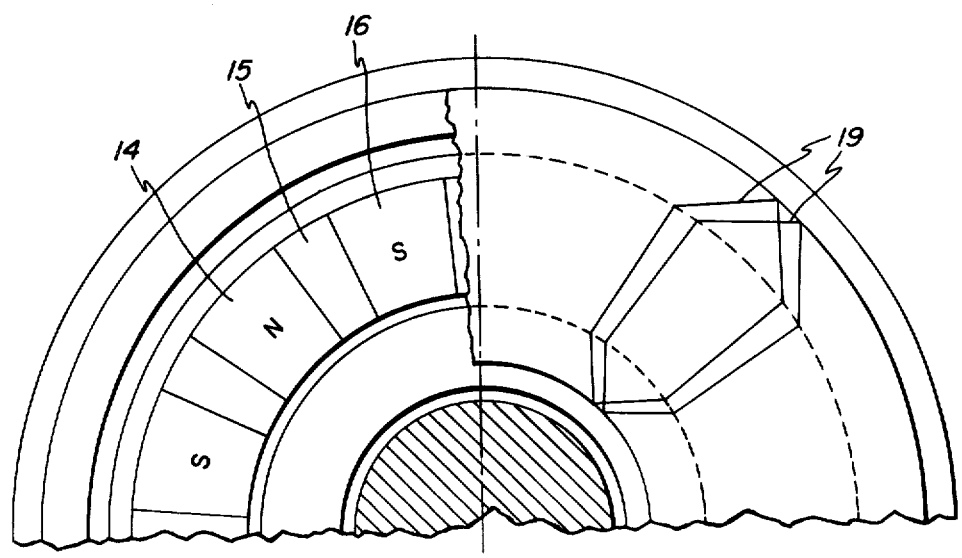
FIG. 2 is a partial schematic view illustrating a part of a stator disk with a section broken-out to illustrate part of an adjacent rotor disk.
Figure 3:
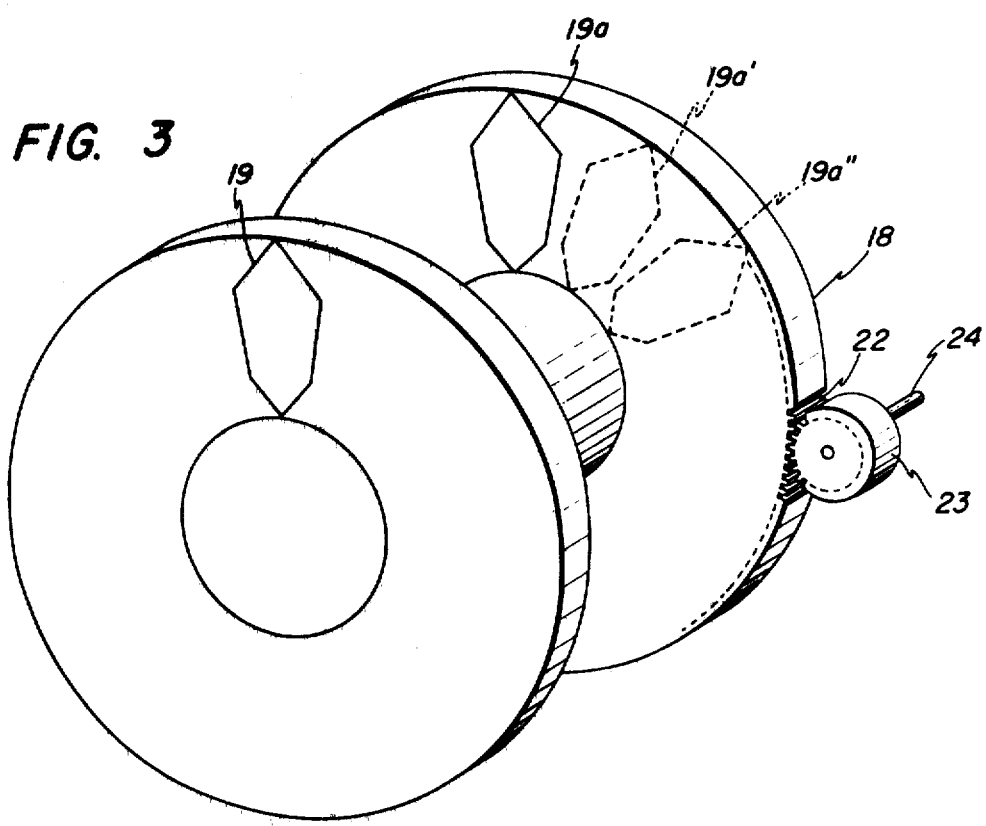
FIG. 3 is a perspective view illustrating the position of stator windings in aligned and misaligned positions.

In FIGS. 1-3, a dynamoelectric machine 10 embodying the invention is shown. The machine 10 includes a rotor 11 including a rotor shaft 12 having a plurality of rotor disks 13 attached thereto. Each rotor disk 13 has a plurality of permanent magnets 14 separated by spacers 15 and secured by a support ring 16. The poles of the permanent magnets 14 are positioned in alternating fashion as shown in FIG. 2, so that the magnetic flux is carried axially through the machine. The stator 17 includes stator disks 18 having distributed multiphase, multiturn windings 19 which are interleaved with the rotor disks 13 and mounted concentric thereto within housing 20 and mounting support 21.

As shown in FIG. 3, the instant invention utilizes means such as partial ring 22 and gear 23 rotatable on axle 24 to control the position of the stator disks with respect to each other. Although the ring 22 and gear 23 assembly is shown only with respect to one of the disks 18, it should be understood that such an assembly could be provided for each disk 18. Further, a complete ring surrounding the stator disk 18 could be provided rather than a partial ring as shown. The partial ring must extend in an arc adequate to provide the necessary mechanical movement of the disks as described hereinafter. The ring gear 22 is interposed between the stator disk 18 and the surrounding housing wall 20 as illustrated in FIG. 1.

Appropriate means are provided to secure the movable stator disks to the support 21. Mounting rings 24 are rigidly fixed to the support 21 for the fixed stator disks. For the movable disks the mounting rings 24 are movably secured to the support 21. A slide surface of material having a low coefficient of friction, such as alumina, could be provided on each of support 21 and ring 24 to allow relative motion between them. Alternatively, the ring 24 and support 21 could have a mating tongue and groove arrangement or any other conventional connection arrangement to secure the disks slidably within support 21.

Although a gear and partial ring gear are shown, it should be understood that any other suitable form of rotation apparatus could be used. For example, a friction wheel could be used to rotate the stator disks, or a plurality of gears could support and control the position of the stator disks. The partial ring gear could be located along the radially-outer portion of one axial face of the stator disks and the drive gear oriented to engage the ring gear in that position. Thus, it is clear that many embodiments of the movement and support apparatus will occur to those skilled in the art.

By connecting the stator disks 18 electrically in series, the voltages generated in each disk are additive. When the windings 19 of a three phase machine are aligned so that the poles of windings of the same phase are mechanically aligned, the magnetic flux will be oriented in a pattern such that the voltages of the separate disks add to produce an output voltage equal to the algebraic sum of the partial voltages. This additive affect is intentionally used in the instant invention to control output voltages of the machine. By rotating the stator windings 19, the poles of the distributed windings 19 of the same phase on adjacent disks are moved out of alignment so that the phasor addition of the voltages produces an output less than the sum of the absolute values of the voltages of the individual disks.

If the windings are connected in parallel the disclosed technique will result in a voltage reduction at the output terminals of the machine. However, in this configuration a substantial increase in circulating current occurs within the windings causing a substantial increase in internal $I^2R$ losses. Therefore, this connection is impractical.

In FIG. 3, two stator disks 18 are shown; one fixed, and the other having the gear 24 and ring 22 assembly to adjust the position of the windings 19 as shown. In a first position, shown in phantom in FIG. 3, the windings 19a' is 90 electrical degrees out of alignment with the windings 19 of the other disk 18. In the other position shown in phantom at 19a" in FIG. 3, the stator windings 19a" is 180 electrical degrees out of phase with the winding 19 on the fixed stator disk. In the embodiment shown in FIG. 3 the mechanical angle between windings of the same phase in adjacent disks effective to cancel the voltages is 60° or half the 120° spacing between phases on each disk 18. If other than three phase power were applied to the stator, an angle different from 60° would be required to offset the magnetic fields of adjacent disks to provide voltage cancellation.

Machines of the multiphase type described herein are capable of generating voltages in the range of 100 volts to several thousand volts. Energy density of the machines of the type described is in the range above 0.50 KVA/lb. with a preferred range of 1-3 KVA/lb. Output from such machines operating at speeds up to 30,000 RPM and power ratings up to 100 KVA may be controlled. Typical phase voltages are in the 120-180 volts AC range.

Figure 4A:
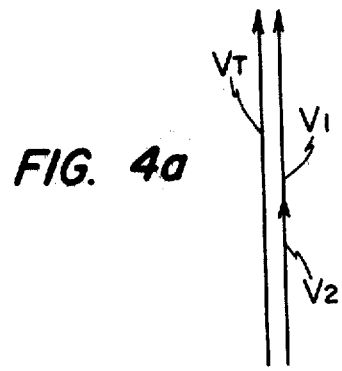
FIGS. 4a–c illustrate phasor diagrams illustrating the addition of voltages in adjacent disks at three separate relative positions of the stator windings.
Figure 4B:
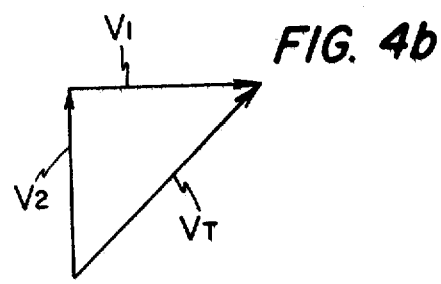
Figure 4C:
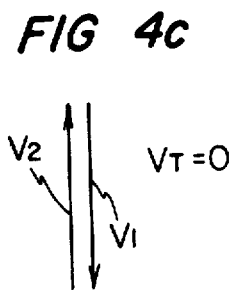

The result of this alignment adjustment for a three phase generator is illustrated in FIG. 4. In FIG. 4a is shown the resultant voltage $V_t$ of the two voltages $V_1$ and $V_2$ added in series when the two windings of the same phase are in alignment. In that position, the voltages $V_1$ of the first winding and the voltage $V_2$ of the second winding add algebraically to the voltage $V_t$. In FIG. 4b is shown the resultant voltage of the first offset position 19a' shown in FIG. 3 in which the second stator winding is 90 electrical degrees offset from the first stator winding. The voltages add as shown in FIG. 4b to produce an output voltage $V_t$ equal to the phasor sum of the voltages $V_1$ and $V_2$. As can be seen from the diagram in FIG. 4b, the absolute value of voltages $V_t$ is less than the sum of the absolute magnitudes of the voltages $V_1$ and $V_2$. In FIG. 4c is shown the resultant voltage $V_t$ when the two stator windings of the same phase are 180 electrical degrees misaligned as shown in FIG. 3 at 19a". Since the magnetic fields are 180 degrees out of phase, the voltages produced algebraically cancel each other to produce an output voltage $V_t = 0$.

By the technique described, output voltage from the magnetic synchronous generator can be controlled in a range from zero to the maximum output voltage, which is determined by the magnetic field strength, the number of turns in each winding and the number of disks. Similarly, the power factor of a synchronous motor can be controlled. My instant invention provides a control means and method for high-speed, multiphase permanent magnet machines without requiring sacrifice of high energy density.

Best Mode

The best mode contemplated incorporates a plurality of rotor disks having high coercive force samarium cobalt magnets spaced around its periphery, and three-phase distributed windings located on stator disks interleaved with the rotor disks. The distributed windings are located such that the poles of the stator windings are separated by angles of 120° around the stator disk. A gear and arcuate partial ring gear are attached to alternate stator disks to control the relative position of the poles of adjacent stator windings.

While preferred features and the best mode of the invention have been shown, many modifications and changes will occur to those skilled in the art. It is, therefore, to be understood that the appended claims are intended to cover all such modifications and changes as fall within the true scope of the invention.

I claim:

1. In a permanent magnet excited disk-type synchronous generator having a plurality of stator winding disks with distributed multiphase, multiturn windings thereon, and a plurality of rotor disks rotatable about an axis having permanent magnets mounted thereon and oriented in such a fashion that the magnetic flux is directed axially through the mahcine, the improvement comprising:

means for controllably rotating alternate ones of said stator winding disks about said axis with respect to adjacent stationary stator winding disks to place distributed windings in the rotated stator disks in a preselected angular orientation relative to the distributed windings in said stationary stator winding disks to control the field flux density of the generator to control the generator output voltage.

2. The improvement of claim 1 wherein the means for rotating said alternate ones of said stator winding disks comprises, for each of said alternate ones of said stator winding disks, respectively, a gear and arcuate partial ring gear assembly, said partial ring gear being affixed to the outer circumference of a respective one of said stator winding disks.

3. The improvement of claim 1 wherein the permanent magnets are high coercive force samarium cobalt magnets.

4. The improvement of claim 1 wherein the windings on the stator winding disks are series connected.

5. The improvement of claim 1 wherein said means for rotating alternate ones of said stator winding disks comprises means to rotate a plurality of alternate ones of said stator disks.

6. The improvement of claim 1 wherein each stator disk is surrounded by a ring gear operably engaged by a gear wheel adapted to rotate said ring gear and stator disk.

7. In a permanent magnet excited disk-type synchronous motor having a plurality of stator winding disks with distributed multiphase, multiturn windings thereon, and a plurality of rotor disks rotatable about an axis having permanent magnets mounted thereon and oriented in such a fashion that the magnetic flux is directed axially through the machine, the improvement comprising:

means for controllably rotating alternate ones of said stator winding disks about said axis with respect to adjacent stationary stator winding disks to place distributed windings in the rotated stator disks in a preselected angular orientation relative to the distributed windings in said stationary stator winding disks to control the flux density of the motor to control the power factor of the motor.

8. A method of controlling output voltage of a permanent magnet excited disk-type synchronous generator having a rotor comprising a plurality of disks rotatable about a longitudinal axis through the center thereof; said disks having permanent magnets mounted thereon in a multipolar configuration and oriented in such a fashion that the magnetic flux of said magnets is directed axially through said machine; and a stator comprising a plurality of winding disks interleaved and concentric with said rotor disks and having distributed multiphase, multiturn windings thereon, the steps comprising:

exciting said multiphase stator windings; and circumferentially rotating alternate ones of said stator disks to move poles of said windings on said alternate ones of said stator disks to a preselected angular orientation relative to the poles of the windings of the same phase on the other ones of said stator disks.

9. The method of claim 8 wherein the step of rotating said alternate ones of said stator disks comprises rotating said alternate ones of said disks by operating a respective gear and partial ring gear assembly.

10. The method of claim 10 wherein the step of rotating said alternate ones of said disks comprises rotating said alternate ones of said disks 90 electrical degrees.

11. The method of claim 10 wherein the step of rotating said alternate ones of said disks 90 electrical degrees comprises rotating said alternate ones of said disks 30 mechanical degrees.

12. The method of claim 10 wherein the step of rotating said alternate ones of said disks comprises rotating said alternate ones of said disks 180 electrical degrees.

13. The method of claim 12 wherein the step of rotating said alternate ones of said disks 180 electrical degrees comprises rotating said alternate ones of said disks 60 mechanical degrees.

14. The method of claim 10 wherein the step of rotating comprises rotating said alternate ones of said stator disks in the same circumferential direction.

15. The method of claim 10 wherein said stator windings comprise uniformly spaced three phase windings.

* * * * *